Aug. 21, 1934.     C. JOHNSON     1,970,753
PRESSURE MEASURING DEVICE
Filed May 20, 1931

INVENTOR
Clarence Johnson.
BY
ATTORNEY

Patented Aug. 21, 1934

1,970,753

UNITED STATES PATENT OFFICE 1,970,753

PRESSURE MEASURING DEVICE

Clarence Johnson, Cleveland, Ohio, assignor to Bailey Meter Company, a corporation of Delaware Application May 20, 1931, Serial No. 538,781

14 Claims. (Cl. 73—31)

This invention relates to pressure measuring devices, and especially to that class of pressure responsive or measuring devices in which a liquid sealed bell is positioned through the application to the bell of a pressure differential, and in which the buoyant force of the bell in the sealing liquid is counterbalanced by a weight or other means. By "pressure differential" I mean any two pressures of which one may be the pressure of the atmosphere.

The purpose of the invention is to provide an improved device of the type described, wherein the bell is inherently stable and tends to rise and fall vertically in the sealing liquid without undue tendency to tilt from the vertical or introduce undesirable friction in the positioning of the parts.

A further object of the invention is to provide an improved arrangement of parts, wherein the vertical positioning of such a bell in a sealing liquid is translated into angular motion or other motion for use as an indication of change in the pressure differential, and wherein the translation is made in such a manner that the motion of the indicating means will be directly proportional to the vertical travel of the bell.

I have chosen to illustrate and will describe an embodiment of my invention wherein a liquid sealed bell is acted upon by a pressure differential resulting from a change in the velocity of a fluid flowing through an orifice, flow nozzle, or other like device well known in the art, which may be commonly used for creating such a pressure differential bearing a known relation to the rate of flow of the fluid. It will be apparent to those skilled in the art that the construction illustrated and described might be used equally as well in connection with a pressure differential of which one pressure were greater or less than that of the atmosphere, and the other pressure were that of the atmosphere.

Figure 1:
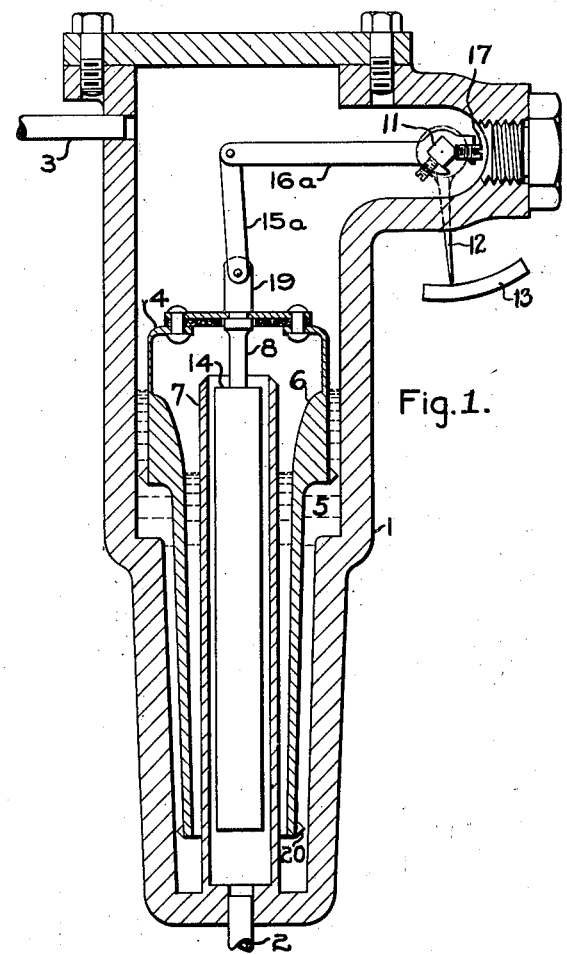
Fig. 1 is a sectional elevation of a fluid meter embodying my invention.

Referring to Fig. 1, I have shown a casing generally indicated at 1 to which are connected pressure pipes 2 and 3, communicating respectively at the inlet and outlet of an orifice (not shown) inserted in a conduit (not shown) through which a fluid flows; the pipes 2 and 3 transmitting to the casing 1 a pressure differential resulting from flow of fluid through the orifice and bearing a known relation to the rate of fluid flow therethrough. The assembly illustrated in Fig. 1, representing a measuring device or meter of the rate of fluid flow through the conduit (not shown).

Within the casing 1 the vertical position of a bell 4, pressure sealed by a liquid such as mercury and indicated at 5 is determined by the magnitude of the difference between the pressure which is applied to the interior of the bell through the connecting pipe 2 and that applied to the exterior of the bell through the connecting pipe 3, together with other variable or constant factors such as the cross-sectional area, wall thickness, etc. of the bell.

The bell 4 is so shaped that the vertical motion of the bell is directly proportional to the change in rate of fluid flow, whereas the rate of fluid flow bears a functional relation to the pressure differential created across the orifice and impressed on the bell. By making the walls of the bell of material thickness and accurately shaped as indicated at 6 so that the cross-sectional area of the walls at the surface of the liquid is progressively varied as the bell is positioned vertically, the change in buoyancy due to such movement is modified, and the motion of the bell is directly proportional to changes in the rate of fluid flow. It is apparent, however, that the bell may be of any known or desired shape, according to the relation which is desired between bell motion and pressure differential, and it is to be understood that no claim is made involving the peculiar shape of this bell, nor is my invention to be considered as limited to devices in which equilibrium is obtained through changes in the buoyancy of the bell as it moves into or out of the sealing liquid, for it will be evident to those skilled in the art that the invention is equally applicable to similar devices of the type described, wherein a bell sealed in a liquid is employed, regardless of whether the counterbalancing force is secured by utilizing the change in buoyancy of the bell or whether it is secured through a spring, displacer or other means mechanically linked to the bell.

As illustrated in Fig. 1, the sealing liquid 5 is contained in an annular chamber bounded by the interior of the casing 1 on the outside, and on the inside by the exterior of a cylindrical tube 7 rising centrally within the casing 1; the tube 7 forming in effect an extension to the pressure pipe 2 leading to within the bell 4, which bell is shown as being generally cylindrical in shape and having its wall in the annular chamber containing the sealing liquid.

A feature of my invention consists in the simple and effective means provided for maintaining the bell 4 in a vertical position without the use of constraining means which might create objectionable friction. By securing a counterweight 14, used to counterbalance the buoyancy of the bell in the sealing liquid, to a rod 8 which passes through the tube 7, the center of gravity of the bell and any parts attached thereto may be located below the metacenter of the bell, regardless of its position, and the bell will therefore be in stable equilibrium when in the vertical position, and if tilted from the vertical will return to that position unless constrained from so doing. To confine the lateral movement of the bell within certain predetermined limits, two or more projections 20 may be provided of a shape to give practically a point contact with the interior of the casing 1, or similar means in the form of rollers or guides may be used.

The movement of the bell is communicated to a spindle 11 by a connecting link 15a pivotally connected to an extension 19 secured to the top of the bell 4, and to an oscillatable beam or lever 16a secured to the spindle 11 by means of a set screw 17. The spindle 11 extends to the exterior of the casing through suitable pressure tight bearings to position a pointer 12 relative to an index 13, the arrangement being such that the pointer 12 will indicate relative to the index 13 the relative position vertically of the bell 4 and may read directly in units of rate of fluid flow through the conduit to which the pressure pipes 2 and 3 communicate.

As far as I am aware, in devices of the class described heretofore disclosed wherein the linear motion of a reciprocating member is translated to a rotating or angular motion, such motions are not directly proportional but bear a functional relationship to each other, due to the effect commonly known as angularity, thereby necessitating the use of a non-uniformly graduated scale, which is undesirable. However, I have found that by properly proportioning the length of the link 15a and beam 16a, the angular motion of the spindle will be directly proportional to the linear bell motion.

In operation, I apply through the pressure pipe 2 to the casing 1 the pressure existing in the conduit through which the fluid to be measured is flowing, at the inlet to the orifice. I apply to the casing 1 through the pressure pipe 3 a pressure existing in the conduit at the discharge side of the said orifice, which when fluid is flowing through the orifice, will be less than that effective through the pressure pipe 2, the relation being well known in the art. The pressure transmitted through the pipe 2 to the interior of the casing 1 is effective through the tube 7 to the interior of the bell 4 and upon the surface of the sealing liquid 5 within the bell. The pressure transmitted through the pressure pipe 3 to the interior of the casing 1 is effective upon the exterior of the bell 4 and upon the surface of the sealing liquid 5 contained between the exterior surface of the bell and the interior surface of the casing. The pressure differential bearing a known relation to the rate of fluid flow is therefore effective upon the interior and exterior of the bell 4 for vertical positioning of the same. It is understood that the remainder of the casing 1 is filled with fluid or condensate of fluid whose rate of flow is being measured, or by air or any trapped fluid which does not affect the sealing properties of the liquid 5 relative to the bell 4, as is well known in the art. The counterbalance weight 14 has been shown as being out of the sealing liquid 5, connected with the interior of the bell 4, and so located that the center of gravity of the assembly is below the metacenter to provide in the structure an inherent tendency toward stable equilibrium. Vertical positioning of the bell 4 and its connected parts through application to the bell of a differential pressure, is translated to a rotary motion of the spindle 11 extending exterior of the casing 1 to position the pointer 12 relative to the index 13 in increments directly proportional to increments of rate of flow; the design of the bell 4 being such that the non-linear relation between differential pressure and rate of flow is thereby corrected.

Figure 2:
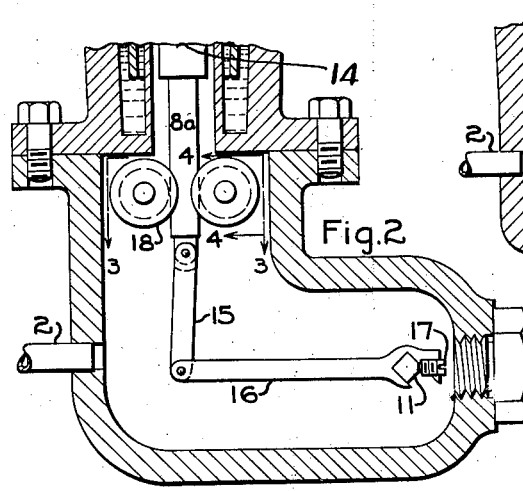
Fig. 2 is a sectional elevation of a fragment of a meter embodying a modification.
Figure 3:
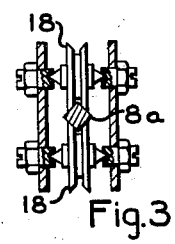
Fig. 3 is a plan view in the direction of the arrows along the line 3—3 of Fig. 2.
Figure 4:
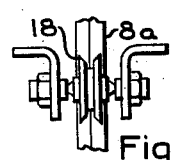
Fig. 4 is a side elevation in the direction of the arrows along the line 4—4 of Fig. 2.

In Fig. 2 a modified construction is shown, wherein the movement of the bell is communicated to the spindle 11 by a connecting link 15 pivotally connected to a rod 8a and by an oscillatable beam or lever 16 secured to the spindle 11 by means of setscrew 17. The guide rollers 18 shown in detail in Figs. 3 and 4 constrain the bell to a vertical motion. I have herein shown the rod 8a secured to the lower ends of the counterweight 14 and the lower portion of the casing 1 modified to provide a housing for the links 15, 16 and associated parts. However, it will be at once apparent to those skilled in the art that I may, if desired, secure the rod 8a to the top of the bell 4 and transmit the motion of the bell to the spindle 11, much as I have shown in Fig. 1.

Figure 5:
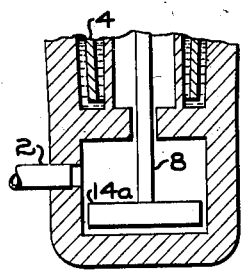
Fig. 5 is a sectional elevation of a fragment showing a further modification.

In Fig. 5 I have shown a modification of the construction of Fig. 1, wherein the weight 14 or a part of it has been concentrated at the lower end of the rod 8 as indicated at 14a, and completely below the lowermost point of the bell 4. It will be apparent that a part of the weight may be retained within the confines of the bell 4 and the remainder positioned below the bottom of the bell, or any desired combination of such location effected, so long as the primary result is attained, whereby the center of gravity of the bell, weight and other parts is below the metacenter.

Having now described certain preferred embodiments of my invention, I desire it to be distinctly understood that I am not to be limited thereby except by the claims in view of prior art.

What I claim as new and desire to secure by Letters Patent of the United States, is:

1. In a pressure measuring device wherein a member is linearly moved in a reciprocating manner vertically in response to variations in a pressure differential, an arm for rendering available the movement of said device mounted for angular motion about a center, and movable connecting means comprising a link pivotally connecting said member and arm to drive said arm whereby to effect angular movement of said arm substantially directly proportional to the linear movement of said member in the range of the device, said link having an effective length between its pivot centers less than the effective length of said arm between its center of rotation and its pivot center of connection with the link, said effective length of the arm being greater than the horizontal distance between the center of rotation of the arm and the axial line of movement of said member, the pivot center line of the arm being substantially horizontal when said member is in the mid-position of its range of vertical travel.

2. A pressure measuring device, comprising in combination, a casing, a pressure receiving bell adapted to be positioned vertically in said casing responsive to variations in the difference in pressures applied within and without the bell, a sealing liquid for the bell, the wall of the bell having sufficient thickness to counterbalance by change in buoyant effect the force acting upon the bell when the bell is submerged in greater or lesser amount in the sealing liquid through a change in pressure differential, a member secured to the interior of the bell, a weight associated with said member for counterbalancing the buoyancy of the bell in the sealing liquid, said member and said weight removed from the sealing liquid, said weight positioned vertically below said bell, the center of gravity of the bell and the weight together being below the center of support, and indicating means positioned by said bell.

3. A pressure measuring device comprising in combination, a casing, a pressure receiving bell adapted to be positioned vertically in said casing responsive to variations in the difference in pressure applied within and without the bell, a sealing liquid for the bell, a member secured to the bell, a weight associated with said member for counterbalancing the buoyancy of the bell in the sealing liquid, said member and said weight removed from the sealing liquid, an arm for rendering available the movement of the bell mounted for angular motion about a center, and movable connecting linkage connecting the bell and arm to drive said arm whereby to effect angular movement of the arm substantially directly proportional to the linear movement of the bell within a predetermined range.

4. A pressure measuring device comprising in combination, a casing, a pressure receiving bell adapted to be positioned vertically in said casing responsive to variations in the difference in pressure applied within and without the bell, a sealing liquid for the bell, a pressure transmitting tube extending through the sealing liquid to the interior of the bell, a weight for counterbalancing the buoyancy of the bell in the sealing liquid, said weight connected with the inside of the bell and suspended in said tube, the center of gravity of the bell and the weight together being below their metacenter, an arm for rendering available the movement of the bell mounted for angular motion about a center, and movable connecting linkage connecting the bell and arm to drive said arm whereby to effect angular movement of the arm substantially directly proportional to the linear movement of the bell within a predetermined range.

5. In a pressure measuring device wherein a member is linearly moved in a reciprocating manner in response to variations in a pressure differential, an arm for rendering available the movement of said device mounted for angular motion about a center, and movable connecting means comprising a link pivotally connecting said member and arm to drive said arm whereby to effect angular movement of the arm substantially directly proportional to the linear movement of the member in the range of the device, said link having an effective length between its pivot centers less than the effective length of said arm between its center of rotation and its pivot center of connection with the link, the effective length of the arm being greater than the perpendicular distance between the center of rotation of the arm and the axial line of movement of said member to which said link is connected.

6. In a pressure measuring device wherein a member is linearly moved in a reciprocating manner in response to variations in a pressure differential, an arm for rendering available the movement of said device mounted for angular motion about a center, and movable connecting means comprising a link pivotally connecting said member and arm to drive said arm whereby to effect angular movement of said arm substantially directly proportional to the linear movement of the member in the range of the device, said link having an effective length between its pivot centers less than the effective length of said arm between its center of rotation and its pivot center of connection with the link, said effective length of the arm being greater than the perpendicular distance between the center of rotation of the arm and the axial line of movement of said member, the pivot center line of the arm being substantially perpendicular to the center line of the member when said member is in mid-position of its range of travel.

7. A pressure measuring device, comprising in combination, a casing, a pressure receiving bell adapted to be positioned vertically in said casing responsive to variations in the difference in pressure applied within and without the bell, a sealing liquid for the bell, an arm for rendering available the movement of the bell mounted for angular motion about a center, and movable connecting means comprising a link pivotally connecting the bell and arm to drive said arm whereby to effect angular motion of the arm substantially directly proportional to the linear movement of the member through a predetermined range, said link having an effective length between its pivot centers less than the effective length of said arm between its center of rotation and its pivot center of connection with the link, the effective length of the arm been greater than the horizontal distance between the center of rotation of the arm and the axial line of movement of the bell.

8. A pressure measuring device, comprising in combination, a casing, a pressure receiving bell adapted to be positioned vertically in said casing responsive to variations in the difference in pressure applied within and without the bell, a sealing liquid for the bell, a weight associated with said bell for counter-balancing the buoyancy of the bell in the sealing liquid, said weight removed from the sealing liquid, an arm for rendering available the movement of the bell mounted for angular motion about a center, and movable connecting means comprising a link pivotally connecting the bell and arm to drive the arm whereby to effect angular motion of said arm substantially directly proportional to the linear movement of a member through a predetermined range, said link having an effective length between its pivot centers less than the effective length of said arm between its center of rotation and its pivot center of connection with the link, the effective length of the arm being greater than the horizontal distance between the center of rotation of the arm and the axial line of movement of the bell.

9. A pressure measuring device, comprising in combination, a casing, a pressure receiving bell adapted to be positioned vertically in said casing responsive to variations in the differences in pressures applied within and without the bell, a sealing liquid for the bell, a pressure transmitting tube extending through the sealing liquid to the interior of the bell, a member secured to the interior of the bell and suspended in said tube, a weight for counterbalancing the buoyancy of the bell in the sealing liquid associated with said member, said weight positioned vertically below the bell, the center of gravity of the bell and the weight together being below their metacenter, an arm for rendering available the movement of the bell mounted for angular motion about a center, and movable connecting means comprising a link pivotally connecting the bell and arm to drive the arm whereby to effect angular motion of said arm substantially directly proportional to the linear movement of said member through a predetermined range, said link having an effective length between its pivot centers less than the effective length of said arm between its center of rotation and its pivot center of connection with the link, the effective length of the arm being greater than the horizontal distance between the center of rotation of the arm and the axial line of movement of the bell.

10. A pressure measuring device, comprising in combination, a casing, a pressure receiving bell adapted to be positioned vertically in said casing responsive to variations in the difference in pressures applied within and without the bell, a sealing liquid for the bell, a member secured to the interior of the bell, a weight associated with said member for counterbalancing the buoyancy of the bell in the sealing liquid, said member and said weight removed from the sealing liquid, the center of gravity of the bell and weight together being below their metacenter, an arm for rendering available the movement of the bell mounted for angular motion about a center, and movable connecting means comprising a link pivotally connecting the bell and arm to drive said arm whereby to effect angular motion of the arm substantially directly proportional to the linear movement of said member through a predetermined range, said link having an effective length between pivot centers less than the effective length of said arm between its center of rotation and its pivot center of connection with the link, the effective length of the arm being greater than the horizontal distance between the center of rotation of the arm and the axial line of movement of the bell.

11. A pressure measuring device, comprising in combination, a casing, a pressure receiving bell adapted to be positioned vertically in said casing responsive to variations in the difference in pressure applied within and without the bell, a sealing liquid for the bell, the wall of the bell having sufficient thickness to counterbalance by change in buoyant effect the force acting upon the bell when the bell is submerged a greater or lesser amount in the sealing liquid through a change in pressure differential, a member secured to the interior of the bell, a weight associated with said member for counterbalancing the buoyancy of the bell in the sealing liquid, said member and said weight removed from the sealing liquid, and indicating means positioned by said bell.

12. A pressure measuring device, comprising in combination, a casing, a pressure receiving bell adapted to be positioned vertically in said casing responsive to variations in the difference in pressure applied within and without the bell, a sealing liquid for the bell, a member secured to the interior of the bell, a weight associated with said member for counterbalancing the buoyancy of the bell in the sealing liquid, said member and said weight removed from the sealing liquid, the center of gravity of the bell and the weight together being below their metacenter and indicating means positioned by said bell.

13. A pressure measuring device, comprising in combination, a casing, a pressure receiving bell adapted to be positioned vertically in said casing responsive to variations in the difference in pressure applied within and without the bell, a sealing liquid for the bell, the wall of the bell having sufficient thickness to counterbalance by change in buoyant effect the force acting upon the bell when the bell is submerged in greater or lesser amount in the sealing liquid through a change in pressure differential, a pressure transmitting tube extending through the sealing liquid to the interior of the bell, a weight for counterbalancing the buoyancy of the bell in the sealing liquid, said weight connected with the inside of the bell and suspended in said tube, and indicating means positioned by said bell.

14. In a pressure measuring device wherein a member is linearly moved in a reciprocating manner vertically in response to variations in a pressure differential, an arm for rendering available the movement of said device mounted for angular motion about a center, and movable connecting means comprising a link pivotally connecting said member and arm to drive said arm whereby to effect angular movement of said arm substantially directly proportional to the linear movement of said member in the range of the device, said link having an effective length between its pivot centers less than the effective length of said arm between its center of rotation and its pivot center of connection with the link, the effective length of the arm being greater than the horizontal distance between the center of rotation of the arm and the axial line of movement of said member.

CLARENCE JOHNSON.